United States Patent Office 3,457,207
Patented July 22, 1969

3,457,207
QUICK-DRYING OIL-MODIFIED ALKYD
RESIN COMPOSITIONS
Klaus Gorke, Hullern uber Haltern, and Klaus Heidel,
Marl, Germany, assignors to Chemische Werke Huls
A.G., Marl, Germany
No Drawing. Filed Aug. 18, 1966, Ser. No. 573,213
Claims priority, application Germany, Aug. 20, 1965,
C 36,694
Int. Cl. C08g 17/16
U.S. Cl. 260—22          17 Claims

ABSTRACT OF THE DISCLOSURE

For obtaining alkyd coating compositions which are simultaneously rapid-drying, both on the surface and throughout the body of the coating film, and are also of a sufficient solids concentration and viscosity to yield relatively thick film, e.g. 100 microns, there is used in such coating compositions an adduct of:
(a) A liquid polydiene, e.g. polybutadiene, having more than 50% cis-1,4 double bond and a viscosity of 30–30,000 centipoises at 50° C.; and
(b) An $\alpha,\beta$-unsaturated dicarboxylic acid and/or an anhydride thereof.

---

The invention relates generally to quick-drying alkyd resins, and more particularly, to novel modified alkyd resins which are particularly suitable for use as coating compositions.

The natural and/or synthetic drying oils or stand oils, such as linseed oil, wood oil, soybean oil, castor oil, safflower oil, low molecular weight viscous 1,4-polybutadiene, are particularly valuable as coating materials. In contrast to many of the other commonly used coating materials, for example, natural and/or synthetic resins, such as glyptals, nitrocellulose, and polymeric materials, such as polyvinyl chloride, polyesters, epoxide resins, the drying oils have a low inherent viscosity. Moreover, the drying oils are readily soluble in inexpensive and relatively non-toxic solvents, such as white spirits (DIN 51,632), and one-component coating compositions produced therefrom can be easily applied with a brush, roller, or spray gun, and yet they have a relatively high solids content. The drying oils, however, harden considerably more slowly than natural and/or synthetic resins because the curing thereof is effected through autoxidative cross-linking with atmospheric oxygen, the rate of drying depending upon the flow across the wet coating of the air and its diffusion into the coating. In the case of most drying oils, the air penetrates by diffusion into the wet coating to only a shallow depth; consequently, the thickness of each layer is limited by the drying characteristics of the oil. Further, when the thickness of the drying oil is about 200μ, autoxidative cross-linking in the upper layers directly exposed to the air occurs more rapidly than in the layers lying therebelow, and so called wrinkles in the coating develop. Since hardening is accomplished by an increase in volume of the coating, the surface of the coating which dries faster than the interior of the coating increases in volume more rapidly and tends to crease.

To offset the undesirable features of these drying oils, they are often combined with hardened resins, such as glyptals, colophony, phenol resins, amino resins, and epoxide resins. A particularly valuable coating composition is the combination of a drying oil with a glyptal in the form of an alkyd resin. In the preparation of these resins, the drying oil is saponified at a relatively high temperature with concomitant use of a catalyst, the reaction product reacted with a polyol, for example glycerin; and the mixture is then reesterified with a polyvalent acid, for example phthalic acid anhydride. Depending upon the proportion of oil therein, the expressions long-oil alkyds (about 60 to 80% oil), medium-oil alkyds (40 to 60% oil), and short-oil alkyds (less than 40% oil) are generally used.

The alkyd resins find wide application because they dry considerably faster than the drying oils from which they are formed. Even with improved drying rates, the surface of the alkyd coating cures more rapidly than the interior and the danger of formation of wrinkles is not eliminated when thick layers are applied.

In the preparation of an alkyd resin having a low viscosity, comparatively high proportions of drying oil are employed which, at the same time, undesirably retard the rate of drying. Conversely, when only a small proportion of oil is incorporated, the rate of drying is increased, but the viscosity must be reduced by the addition of relatively large amounts of solvents. With these highly diluted alkyds, only extremely thin films can be applied by a single applications and a plurality of superimposed layers are often needed to obtain the desired thickness of the dry coat. Due to the influence of the oil on both the viscosity and drying rate of the alkyd, it has not heretofore been possible to tailor an alkyd having the desired viscosity and rapid drying characteristics.

It is therefore a principal object of the invention to provide an improved coating composition which when dried forms a smooth surface free of creases and wrinkles.

Another object of the invention is to provide an improved quick-drying coating composition having a sufficiently high viscosity to permit the application of a relatively thick film with a single coat.

These and other objects and advantages will become apparent by reference to the following description and claims appended hereto.

To attain these objects, the oxidative drying component of a modified alkyd resin is replaced, to an extent of 8 to 60%, preferably 10 to 50%, by the adduct of an $\alpha,\beta$-unsaturated dicarboxylic acid, or the anhydrides thereof, and a liquid polydiene, having more than 50%, preferably more than 70%, cis-1,4-double bonds and a viscosity of 30 to 30,000, preferably 80 to 10,000 centipoises/50° C. The alkyd resins modified in this manner dry at an unexpectedly quick rate, and yet have a sufficiently low viscosity, from about 10 to 50 poises/20° C., in a 70 to 80% by weight solution in xylene or in white spirits (DIN 51,632), to permit the application of a thick film with a single coat.

By the expression "oil-modified alkyd resins" is meant esters derived from polycarboxylic acids and polyhydric alcohols which are modified with a monocarboxylic acid from drying and semidrying oils. Of the polycarboxylic acids suitable for use herein are the aliphatic or aromatic, saturated or unsaturated polycarboxylic acids or the anhydrides thereof. Examples of such compounds are: phthalic acid, isophthalic acid, tetrahydro- and hexahydrophthalic acid, tetrachlorophthalic acid, hexachloroendomethylenetetrahydrophthalic acid, succinic acid, adipic acid, sebacic acid, endomethylenetetrahydrophthalic acid, trimellitic acid, and pyromellitic acid. Suitable polyhydric alcohols are, for example, bi- and/or highervalent alcohols, such as ethylene glycol, diethylene glycol, propylene glycol (propanediol-1,2), butanediol-1,3, butanediol-1,4, butenediol-1,4, 2,2-dimethyl-propanediol-1,3, 2-ethylhexanediol-1,3, hexanediol-1,6, glycerin, glycerin monoalkyl ether, trimethylol propane, trimethylol propane monoallyl ether, hexanetriol, pentaerythritol, or sorbitol.

The monocarboxylic acids suitable for use herein are the fatty acids in drying and semidrying oils. These fatty acids can be employed directly or in the form of their mono-, di- or tri-glycerides or mixtures thereof, the latter being conventionally formed, for example by the re-esterification of glycerine or pentaerythritol, if desired together with mono- or bivalent alcohols, with oils, such as linseed oil, soybean oil, castor oil, cocoanut oil, oiticica oil, tall oil, wood oil, or similar vegetable oils. In place of the natural monocarboxylic acids, similar acids of a synthetic origin can also be used.

In the coating composition of the present invention, the modified alkyd resins are preferably dissolved in a volatile organic solvent, for example, in an aliphatic hydrocarbon, such as cyclohexane or isopropylcyclohexane, in an aromatic, such as benzene, toluene, xylene, cumene, or tetralin, in an ester, such as methyl or butyl acetate, or methyl glycol acetate; in a ketone, such as acetone, methylethyl ketone, cyclohexanone; in a chlorinated hydrocarbon, such as chloroform or carbon tetrachloride; in a turpentine oil or in compatible mixtures of these solvent. Particularly valuable coating compositions are prepared from 20 to 30 weight percent of a solvent and 70 to 80 weight percent of the modified alkyd resin.

The adduct of the α,β-unsaturated dicarboxylic acid, or the anhydride thereof, and a liquid polydiene having more than 50% cis-1,4-double bonds, can be prepared, for example, by heating a mixture of the dicarboxylic acid anhydride and a liquid polydiene in the presence of a catalyst, such as copper naphthenate. In this reaction it is preferred to employ, per mol of polydiene, at least one mol and preferably 1.2 to 1.6 mols of dicarboxylic acid or the anhydride thereof, the degree of addition depending on the molecular weight of the polydiene employed. When, for example, the reaction is carried out using a low molecular weight polybutadiene, a relatively high percentage of the α,β-unsaturated dicarboxylic acid, or the anhydrides thereof are to be employed, while the use of a high molecular weight polybutadiene requires comparatively lower percentages of the dicarboxylic acid.

In general, the reaction is carried out with 20 to 60 molar percent excess of the acid, but the resultant adduct preferably contains no more than about 35% by weight of the dicarboxylic acid.

To obtain a mixture having a viscosity sufficiently low to facilitate processing; the total content in the modified alkyd resin of the oxidative drying component, or the total oil content, is preferably no lower than about 30%. Very high viscosity mixtures, however, do not form thin films and it is therefore desirable to employ no more than about 80% by weight of the oxidative drying component.

The proportion of the adduct in the oxidative drying component, or the total oil, preferably ranges between 8 and 60%; more preferably between 10 and 50% by weight. Although any proportion of the drying oil can be replaced by the adduct, the most suitable compositions incorporate the above specified amounts of adduct. In applications where a non-homogeneous composition can be tolerated, amounts close to 100% by weight of the drying oil can be replaced by the adduct. The adduct is preferably prepared by the method described in assignee's pending U.S. application Ser. No. 528,376. The polybutadiene to be used to prepare the adduct can contain, in addition to the cis-1,4 double bonds, also trans-1,4 and/or vinyl-1,2 double bonds. Particularly useful are polybutadienes having the following properties:

Structure:
    Centrally positioned cis-1,4-double bonds _____percent__ 70–90
    Centrally positioned trans-1,4-double bonds _____do____ 10–30
    Vinyl-1,2-double bonds _____do____ <3
Viscosity centipoises/50° C. _____ 150–5,000
Density: $d_4^{50}$ _____ 0.885–0.895
Iodine number _____ 400–470

Serving as further starting materials for the production of the adducts (in addition to the liquid polybutadiene having mainly cis-double bonds) are monobasic or dibasic α,β-unsaturated carboxylic acids or their anhydrides. Preferred suitable examples are maleic anhydride and also maleic acid, fumaric acid, itaconic acid, citraconic acid or mesaconic acid.

The alkyd resins are prepared by conventional esterification methods at 150° to 270° C., preferably at 180° to 230° C., in an inert gas atmosphere at atmospheric or subatmospheric pressure, the water of reaction being removed continuously. Esterification may be carried out in a melt or azeotropically in the presence of hydrocarbons, such as benzene, toluene, xylene or white spirit. The alkyd resins may be synthesized from a mixture of all the components. It is often advantageous however, for example to be able to ensure a reliable course of the reaction, to incorporate a portion of the components into an already performed ester. Thus for example the adducts to be used may be preesterified with a portion or the whole of the monohydric or polyhydric alcohols, esterification then being carried to completion in the presence of the polycarboxylic acids.

Another embodiment of the process comprises first preparing alkyd resins containing hydroxyl groups from polycarboxylic acids and polyols, which if desired contain radicals of monohydric alcohols or carboxylic acids, and then reacting these with such amounts of the adducts to be used according to the invention in the course of the final esterification as correspond to the number of available hydroxyl groups.

To accelerate the drying process, metal driers may be added to the alkyl resins or their solutions, particularly for air-drying coatings. The naphthenates of the metals cobalt, nickel, manganese, lead, iron, chromium, zinc, cerium, aluminium, calcium or zirconium, are suitable for purpose. Instead of the naphthenates, the corresponding resinates, oleates, linoleates, octoates or other metal compounds which are soluble in the alkyd resins or their solutions may be added. It is often also favorable to use mixtures of different driers. The amount to be used, on the solids content, is in general from 0.01 to 2% by weight, preferably from 0.01 to 1% by weight of the metal contained in the drier.

The alkyd resins are suitable as air-drying or kiln-drying or elasticising components in binders, particularly for colorless or pigment-containing primers or surface lacquers on wood, stone or metals.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

To demonstrate the advantageous properties of the modified alkyd resins of the present invention, several of the conventional alkyl resins were prepared in comparative Examples I to IV, inclusive, and compared with the present adduct modified alkyds of Examples 1 to 5.

COMPARATIVE EXAMPLE I

There is produced in the conventional manner an alkyd resin of the following composition:

| | Percent |
|---|---|
| Varnish linseed oil | 60.0 |
| Glycerin | 12.9 |
| Phthalic acid anhydride | 27.1 |

The alkyd resin has acid number of 3.9; and 80% by weight solution of said resin in white spirit (DIN 51,632) has a viscosity of 33 poises/20° C.

COMPARATIVE EXAMPLE II

A commercially available alkyd resin of the following composition:

| | Percent |
|---|---|
| Linseed oil | 63.0 |
| Phthalic acid | 27.0 | has an acid number of about 10. The 80% by weight solution in white spirit (DIN 51,632) has a viscosity of 225 poises/20° C.

COMPARATIVE EXAMPLE III

In a conventional manner, there is produced an alkyd resin of the following composition:

| | Percent |
|---|---|
| Soybean oil | 59.8 |
| Phthalic acid anhydride | 27.3 |
| Glycerin | 12.9 |

The alkyd resin has an acid number of 4.2. Its 80% by weight solution in xylene has a viscosity of 10 poises/20° C.

COMPARATIVE EXAMPLE IV

There is produced in the conventional manner another known alkyd resin of the following composition:

| | Percent |
|---|---|
| Linseed oil | 42.0 |
| Phthalic acid anhydride | 38.6 |
| Glycerin | 5.7 |
| Propanediol | 13.7 |

The alkyd resin has an acid number of 15. Its 80% by weight solution in xylene has a viscosity of 54.2 poises/20° C.

Example 1

There is produced in the conventional manner a modified alkyd resin of the following composition:

| | Percent |
|---|---|
| Linseed oil | 53.9 |
| Adduct oil of 90% low-viscosity polybutadiene whose double bonds have an 80% 1,4-cis configuration, and of 9.1% maleic acid anhydride (MA) | 6.1 |
| Phthalic acid anhydride | 26.8 |
| Glycerin | 11.7 |
| Propanediol | 1.6 |

This modified alkyd resin has an acid number of 15.1 and its 80% by weight solution in xylene has the viscosity of 17 poises/20° C.

Example 2

There is produced in the conventional manner a modified alkyd resin of the following composition:

| | Percent |
|---|---|
| Linseed oil | 54.0 |
| Adduct oil of Example 1, containing 16.7% MA | 6.7 |
| Phthalic acid anhydride | 26.0 |
| Propanediol | 1.5 |
| Glycerin | 11.7 |

The acid number of this resin is 13.6. Its 70% by weight solution has a viscosity of 25 poises/20° C.

Example 3

There is produced in the conventional manner a modified alkyd resin of the following composition:

| | Percent |
|---|---|
| Linseed oil | 54.2 |
| Adduct oil as in Example 1, containing 23% MA | 7.2 |
| Phthalic acid anhydride | 25.3 |
| Glycerin | 11.7 |
| Propanediol | 1.5 |

The alkyl resin has an acid number of 14.7. Its 80% by weight solution in xylene exhibits a viscosity of 37 poises/20° C.

Example 4

There is produced in the conventional manner a modified alkyd resin of the following composition:

| | Percent |
|---|---|
| Linseed oil | 39.0 |
| Adduct oil as in Example 1, containing 7.4% MA | 39.0 |
| Phthalic acid anhydride | 13.4 |
| Glycerin | 5.0 |
| Propanediol | 3.9 |

The acid number of the resin is 4.1. Its 80% by weight solution in white spirit (DIN 51,632) has a viscosity of 12 poises/20° C.

Example 5

An alkyd resin of the following composition is produced in a conventional manner:

| | Percent |
|---|---|
| Linseed oil | 26.4 |
| Adduct oil as in Example 1, containing 4.7% MA | 15.7 |
| Phthalic acid anhydride | 38.8 |
| Glycerin | 5.5 |
| Propanediol | 13.6 |

The alkyd resin has an acid number of 17. Its 80% by weight solution in xylene has a viscosity of 38 poises/20° C.

To each of the alkyd resin solutions of Examples 1 to 5 are added the following auxiliary agents, the percent by weight in each case being based on the alkyd resin content of the solution 0.1% by weight Nickel octoate,
0.05% by weight Molybdenum,
0.01% by weight Cobalt,
0.01% by weight Zirconium,
0.5% by weight Commercially available film-preventing (skin-formation preventing) agent sold under the trade name of "Agent 109 J®."

By means of a wiper blade, the solutions produced in the preceding examples are applied to glass plates in layers having a thickness of 100μ, the coated plates then being stored in a climatically controlled chamber (standard climate of 20/65 DIN 50,014). The coated plates are periodically examined to ascertain the dust drying period according to DIN 53,150, and the time in hours for complete drying to be effected. The results of these drying tests are shown in the table below.

TABLE

| Examples | Viscosity in poises | Dust-drying time in hours | Complete drying time in hours |
|---|---|---|---|
| Comparative example: | | | |
| I | 33 | 16 | 30 |
| II | 225 | 20 | 30 |
| III | 10 | 30 | 30 |
| IV | 54.2 | 8 | 1 3 |
| Example: | | | |
| 1 | 17 | 12 | 30 |
| 2 | 24 | 12 | 12 |
| 3 | 37 | 12 | 22 |
| 4 | 12 | 12 | 12 |
| 5 | 38 | 3 | 2 |

1 Days.

It can be seen from the preceding table that the alkyd resin coatings of the present invention which incorporate the adduct, dry on their surface as well as throughout much quicker than previously known alkyd resins. The results are particularly surprising since the polyolefins on which the adduct oil is based contain only isolated double bonds.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and

What is claimed is:

1. A quick-drying, oil-modified alkyd resin composition having incorporated therein as at least 8% by weight of the drying oil an adduct of a member selected from the group consisting an an α,β-unsaturated dicarboxylic acid, the anhydride thereof, and mixtures thereof; and a liquid polydiene having more than 50% cis-1,4-double bonds and a viscosity of 30 to 30,000 centipoises at 50° C., said alkyd resin composition having a viscosity of about 10–50 poises measured as a 70–80% by weight solution in xylene or in white spirits at 20° C.

2. The composition as defined by claim 1 wherein said alkyd resin is a reaction product comprising a polyhydric alcohol, a polybasic acid, a monobasic acid, and an oxidative drying component comprising said drying oil.

3. The alkyd resin as defined by claim 2 wherein the alkyd resin contains from about 30 to 80% by weight of said oxidative drying component.

4. The alkyd resin as defined by claim 3 wherein the oxidative drying component contains between 8 and 60% by weight of said adduct.

5. The alkyd resin as defined by claim 4 wherein the oxidative drying component contains 10–50% by weight of said adduct.

6. The alkyd resin as defined by claim 5 wherein said adduct contains as the polydiene, polybutadiene having more than 70% cis-1,4-double bonds and has a viscosity of 80 to 10,000 centipoises at 50° C.

7. The alkyd resin as defined by claim 6 wherein said adduct contains as the polydiene, a polybutadiene having the following properties:

Structure:
    Centrally positioned cis-1,4-double bonds
        percent__ 70–90
    Centrally positioned trans-1,4-double bonds
        percent__ 10–30
    Vinyl-1,2 double bonds _____percent__ <3
Viscosity: centipoises/50° C. _____ 150–5,000
Density: $d_4^{50}$ _____ 0.885–0.895
Iodine number _____ 400–470

8. The alkyd resin as defined by claim 2 wherein said polyhydric alcohol is selected from the group consisting of ethylene glycol, diethylene glycol, propanediol-1,2, butanediol-1,3, butanediol-1,4, butenediol-1,4, 2,2-dimethyl-propanediol-1,3, 2-ethylhexanediol-1,3, hexanediol-1,6, glycerin, glycerin monoalkyl ether, trimethylol propane, trimethylol propane monoallyl ether, hexanetriol, pentaerythritol and sorbitol.

9. The alkyd resin as defined by claim 2 wherein said polybasic acid and the anhydride thereof is selected from the group consisting of phthalic acid, isophthalic acid, tetrahydro- and hexahydrophthalic acid, tetrachlorophthalic acid, hexachloro-endomethylenetetrahydrophthalic acid, succinic acid, adipi cacid, sebacic acid, endomethylenetetrahydrophthalic acid, trimellitic acid, and pyromellitic acid.

10. The alkyd resin as defined by claim 2 wherein said monobasic acid is selected from the group consisting of linoleic acid, ricinoleic acid and soya bean acid.

11. The alkyd resin as defined by claim 2 wherein said drying oil is selected from the group consisting of linseed oil, soybean oil, ricinoleic oil, cocoanut oil, oiticia oil, tall oil and wood oil.

12. The alkyd resin as defined by claim 1 wherein the α,β-unsaturated dicarboxylic acid and the anhydride thereof is selected from the group consisting of maleic acid, fumaric acid, itaconic acid, citraconic acid and mesaconic acid.

13. The composition as defined by claim 1 wherein said adduct contains as the polydiene, polybutadiene having more than 70% cis-1,4-double bonds and has a viscosity of 80 to 100 centipoises at 50° C.

14. The composition as defined by claim 1 wherein said adduct contains as the polydiene, a polybutadiene having the following properties:

Structure:
    Centrally positioned cis-1,4-double bonds
        percent__ 70–90
    Centrally positioned trans-1,4-double bonds
        percent__ 10–30
    Vinyl-1,2 double bonds _____percent__ <3
Viscosity: centipoises/50° C. _____ 150–5,000
Density: $d_4^{50}$ _____ 0.885–0.895
Iodine number _____ 400–470

15. A composition as defined by claim 1, wherein the adduct is produced on the basis of at least one mol of said member per mol of said liquid polydiene, the resultant adduct having less than 35% by weight of said member.

16. A composition as defined by claim 1, wherein said adduct is prepared on the basis of 1.2–1.6 mols of said member per mol of polydiene.

17. A substrate coated with a dried uniform and substantially homogeneous layer containing the composition as defined by claim 1.

References Cited

UNITED STATES PATENTS

| | | | |
|---|---|---|---|
| 2,181,893 | 12/1939 | Hopkins et al. | 260—22 |
| 2,634,256 | 4/1953 | Sparks et al. | 260—23.7 |
| 2,662,862 | 12/1953 | Crouch | 260—22 |
| 2,876,207 | 3/1959 | Henderson | 260—33.4 |
| 2,888,417 | 5/1959 | Crouch | 260—22 |
| 3,196,121 | 7/1965 | McKay et al. | 260—23.7 |
| 3,218,306 | 11/1965 | Hsieh et al. | 260—23.7 |

OTHER REFERENCES

Chemical Abstracts, vol. 58, No. 9, Apr. 29, 1963, p. 92447h–9248b.

DONALD E. CZAJA, Primary Examiner

R. W. GRIFFIN, Assistant Examiner

U.S. Cl. X.R.

117—124, 134, 148, 167; 260—23.7, 27, 33.4, 33.6, 40, 41.5

UNITED STATES PATENT OFFICE
CERTIFICATE OF CORRECTION

Patent No. 3,457,207          Dated July 22, 1969

Inventor(s) Klaus Gorke, Hullern uber Haltern, and Klaus Heidel

It is certified that error appears in the above-identified patent and that said Letters Patent are hereby corrected as shown below:

Column 1, Line 60, change "accomplished" to
        ---accompanied---

Column 2, Line 7, change "The" to ---These---

Column 7, Line 34, change "6" to ---5---

Column 8, Line 2, change "ricinoleic" to ---ricinen---

Column 8, Line 5, change "ricinoleic" to ---ricinene---

SIGNED AND SEALED
OCT 6 - 1970

(SEAL)
Attest:

Edward M. Fletcher, Jr.          WILLIAM E. SCHUYLER, JR.
Attesting Officer          Commissioner of Patents